United States Patent
Martin et al.

(10) Patent No.: US 6,356,294 B1
(45) Date of Patent: Mar. 12, 2002

(54) MULTI-POINT COMMUNICATION ARRANGEMENT AND METHOD

(75) Inventors: Bryan Martin, Campbell; Oran Davis, Sunnyvale, both of CA (US)

(73) Assignee: 8×8, Inc., Santa Clara, CA (US)

( * ) Notice: Subject to any disclaimer, the term of this patent is extended or adjusted under 35 U.S.C. 154(b) by 0 days.

(21) Appl. No.: 09/132,300

(22) Filed: Aug. 11, 1998

(51) Int. Cl.[7] ................................................. H04N 7/14
(52) U.S. Cl. ................................... 348/14.07; 348/14.09
(58) Field of Search ........................... 348/13–20, 409, 348/415, 586, 591, 592, 721; 370/260–265; 379/93.17, 202; 381/119; 345/123

(56) References Cited

U.S. PATENT DOCUMENTS

| | | | | |
|---|---|---|---|---|
| 4,862,270 A | * | 8/1989 | Nishio | 348/721 |
| 4,993,073 A | * | 2/1991 | Sparkes | 381/119 |
| 5,140,416 A | * | 8/1992 | Tinkler | 348/586 |
| 5,440,721 A | * | 8/1995 | Morgan et al. | 348/409 |
| 5,541,640 A | * | 7/1996 | Larson | 348/19 |
| 5,594,725 A | | 1/1997 | Tischler et al. | 348/15 |
| 5,604,738 A | * | 2/1997 | Shibata et al. | 348/14.08 |
| 5,657,046 A | * | 8/1997 | Nobel et al. | 345/123 |
| 5,657,246 A | | 8/1997 | Hogan et al. | 348/15 |
| 5,737,010 A | * | 4/1998 | Yachi et al. | 348/15 |
| 5,737,011 A | | 4/1998 | Lukacs | 348/15 |
| 5,835,129 A | * | 11/1998 | Kumar | 348/15 |
| 5,838,664 A | * | 11/1998 | Polomski | 370/263 |
| 6,075,571 A | * | 6/2000 | Kuthyar et al. | 348/15 |

\* cited by examiner

*Primary Examiner*—Curtis Kuntz
*Assistant Examiner*—George Eng

(57) ABSTRACT

A videocommunication system combines video signals for screen-region display for multi-point monitoring and/or conferencing. Consistent with one embodiment directed to a modular implementation, each of a plurality of stations includes an arrangement having a video display and a video camera for generating a video signal, and a cascaded arrangement of signal processing units. Each signal processing unit is constructed and arranged for receiving cascaded signals, including at least one cascaded video signal, at a designated position in the cascaded arrangement. Each signal processing unit combines the video signal of an associated one of the stations with a cascaded video signal according to the designated position of the signal processing unit in the cascaded arrangement.

16 Claims, 3 Drawing Sheets

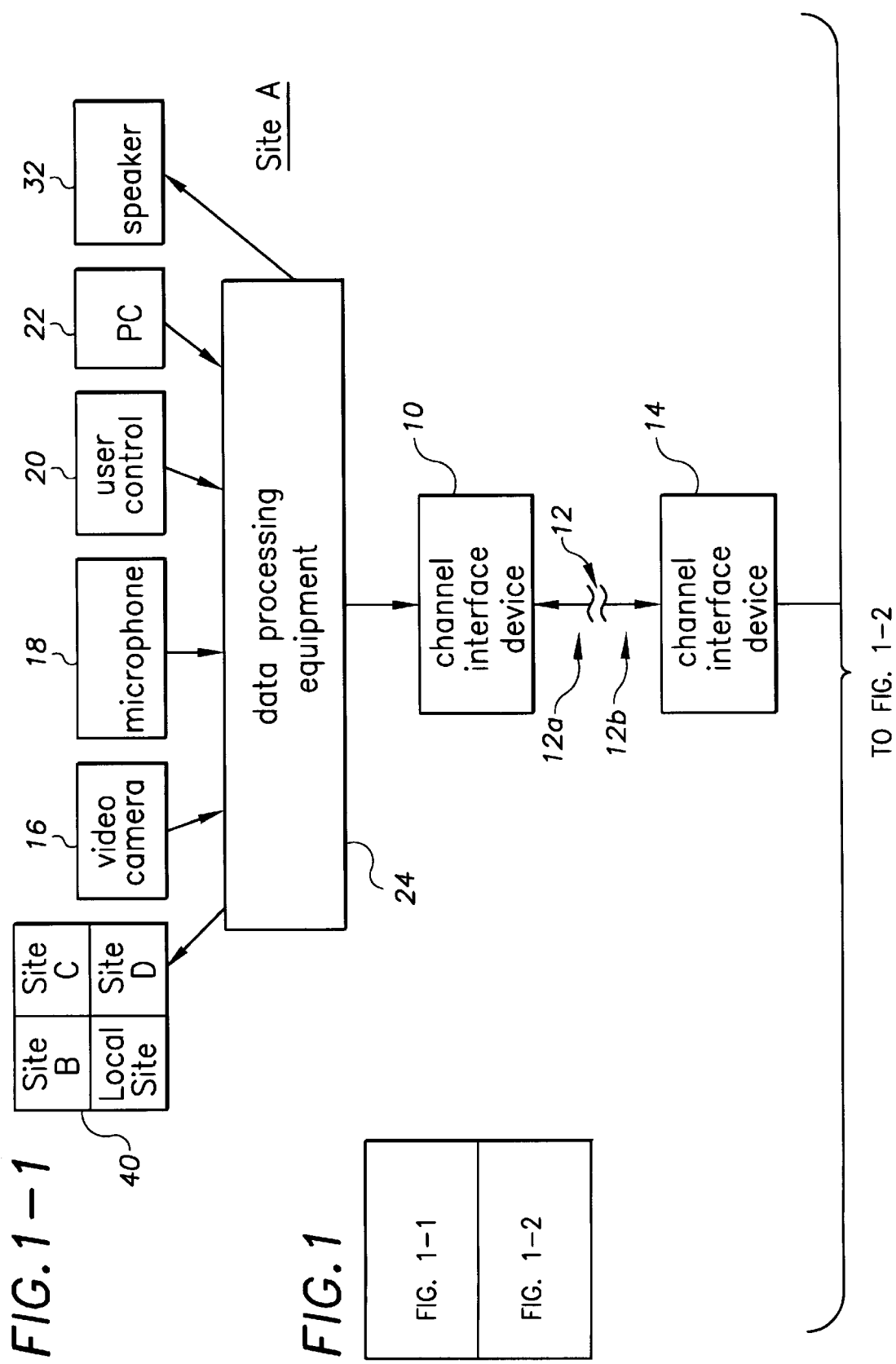

MULTI-POINT COMMUNICATION ARRANGEMENT AND METHOD

FIELD OF THE INVENTION

The present invention relates to image transmission. More particularly, the present invention relates to video communication and to video communication involving cascaded stations.

BACKGROUND OF THE INVENTION

Videocommunication equipment, such as videoconferencing systems and videophone devices, have enabled people to communicate visually without having to travel to a common location. As a result, videocommunication participants can be separated by large distances.

A typical videoconferencing application uses a video camera to capture images of a target, such as a meeting participant or a document. The images are encoded as a data stream and transmitted over a communications channel to a remote location. For example, the data stream may be transmitted over a phone line, an integrated services digital network (ISDN) line, or the Internet. The encoding process is typically implemented using a digital video coder/decoder (codec), that divides the images into blocks and compresses the blocks according to a video compression standard, such as the ITU-T H.263 and H.261 recommendations. In standards of this type, a block may be compressed independent of the previous image or as a difference between the block and part of the previous image.

In a typical videoconferencing system, the data stream is received at a remote location, where it is decoded into a series of images, which may be viewed at the remote location. Depending on the equipment used, this process typically occurs at a rate of one to thirty or more frames per second.

In some videoconferencing applications, it is desirable to transmit images from more than one station for display in real-time. Traditional videoconferencing standards have addressed point-to-point communications where the participants in one location are able to send and receive video, audio and data information to and from participants in a second location. Technologies have been developed to extend these point-to-point connections to allow multi-way or multi-point multi-media communications sessions, emulating the functionality of traditional audio conference calls. Early multi-point servers have allowed all participants to receive the multi-media information from one location, depending on who in the conference was speaking.

More recently, continuous-presence multi-media servers have been developed which allow multiple participants to see and hear most or all of the other participatory locations simultaneously. These continuous-presence systems have been built using a central multi-point server topology where all locations dial into a central multi-media conference server, or a network of conference servers which operate cooperatively to deliver continuous-presence style multi-media information to all participants. These central servers have been built as specialized devices. For example, one specialized device type involves videoconferencing systems built with an array of network interfaces coupled to an array of video, audio, and data decoding units. The array of video, audio, and data decoding units feed individually-decoded streams into a central bridging unit where the data is multiplexed into an appropriate composition of multiple streams and then re-encoded and sent back to each user location. These architectures require powerful computational servers and high-speed backplanes to interconnect the units. The result of this combination has been a very expensive, dedicated hardware system that, practicably, is directed to applications for central office environments.

A more recent multi-media server-type provides a switch-based architecture that simplifies the high-speed interconnect requirement of multiplexing real-time decoded raw video streams within a server environment. The architecture involves the composition of video chains to construct the composite video from multiple sources, through the use of a switch arrangement and relatively complex control software. A significant disadvantage of this architecture is that its switch-based arrangement coupled with its complex control software renders it prohibitive for many lower-cost markets, such as consumer-directed applications.

SUMMARY OF THE INVENTION

Generally, the present invention provides methods and arrangements for displaying images transmitted from multiple locations in real-time.

According to one embodiment of the present invention, a multi-point multi-media system uses off-the-shelf terminals to provide a continuous presence multi-point multi-media function. A more particular aspect of the invention allows a continuous presence server capable of supporting n streams to be constructed by interconnecting n video communications terminals on n different communications lines using standard video conferencing terminal architectures and functions (picture-in-picture).

Another particular embodiment of the invention is directed to a modular implementation, in which each of a plurality of stations has a video display and a video camera for generating a video signal. A central location includes a cascaded arrangement of signal processing units. Each signal processing unit is constructed and arranged for receiving cascaded signals, including at least one cascaded video signal, at a designated position in the cascaded arrangement. Each signal processing unit combines the video signal of an associated one of the stations with a cascaded video signal according to the designated position of the signal processing unit in the cascaded arrangement.

Other particular embodiments of the present invention are directed to methods and specific aspects relating to the above-characterized arrangement.

BRIEF DESCRIPTION OF THE DRAWINGS

Various aspects and advantages of the present invention will become apparent upon reading the following detailed description of various embodiments and upon reference to the drawings in which.

Figures 1, 2:
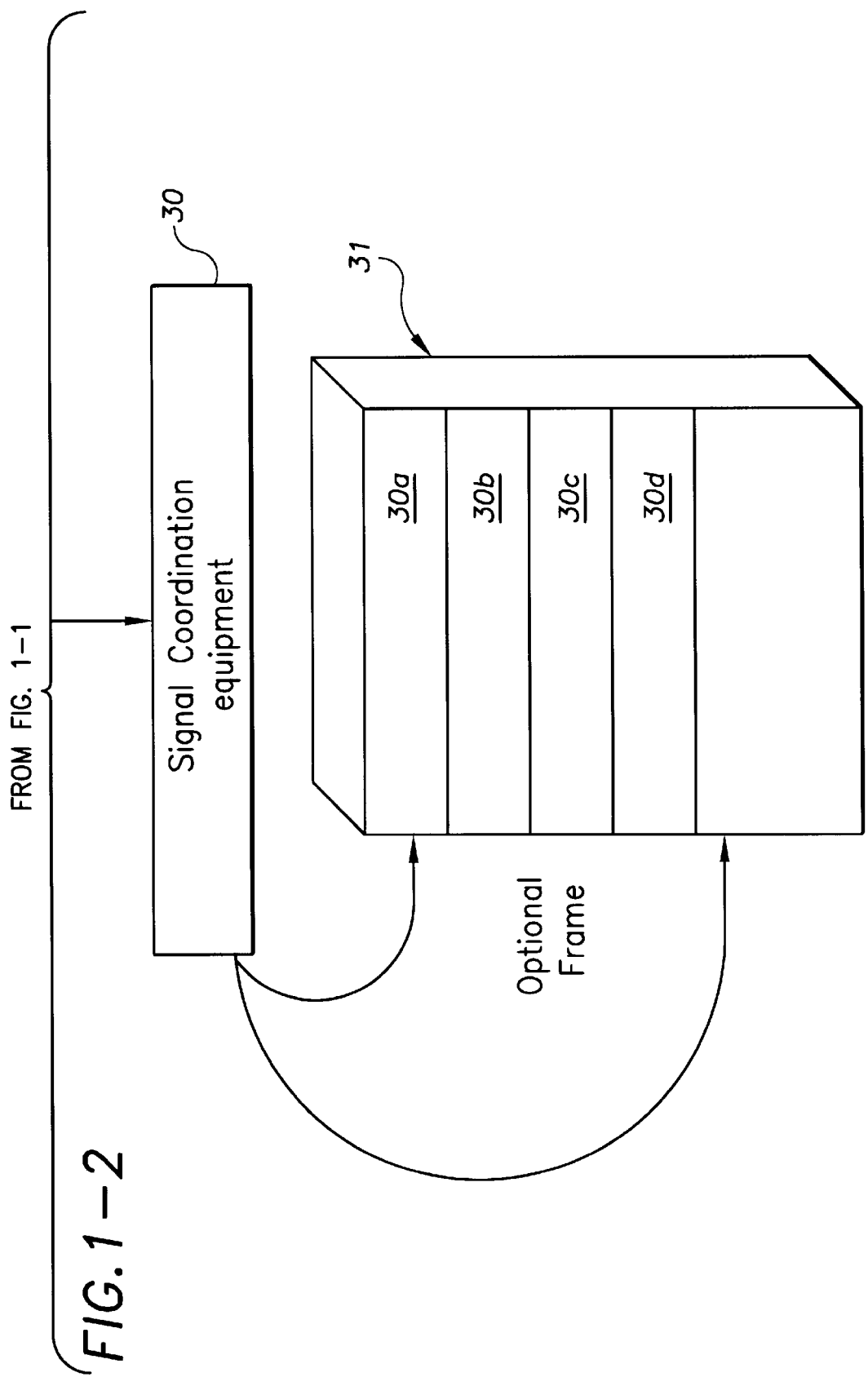
FIG. 1 illustrates a videoconferencing system implementing an example embodiment of the present invention.
FIG. 2 illustrates an example signal coordination arrangement, according to the present invention, which may be used in connection with the example videoconferencing system of FIG. 1.
Figure 2:
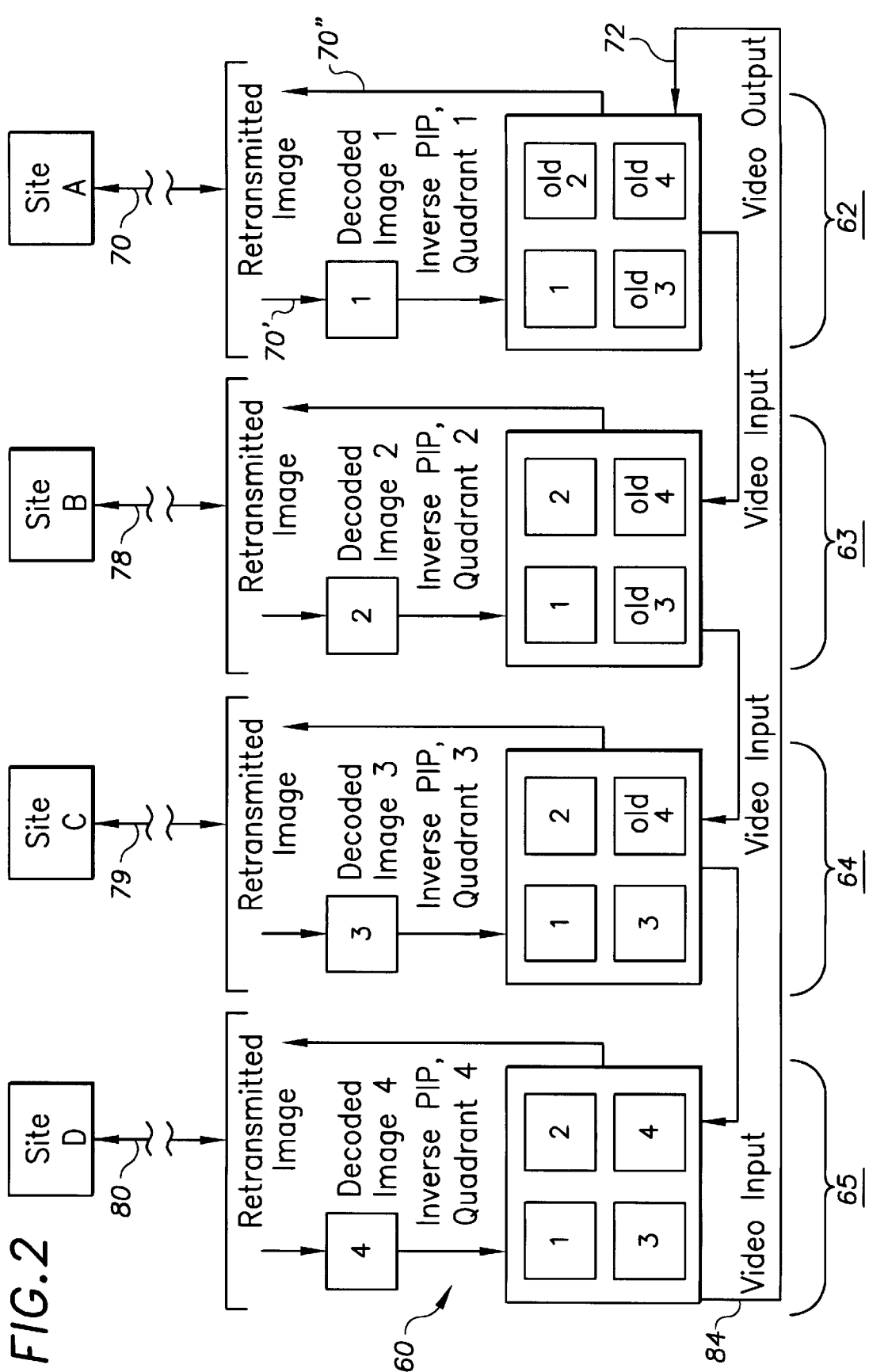

While the invention is amenable to various modifications and alternative forms, specifics thereof have been shown by way of example in the drawings and will be described in detail. It should be understood, however, that the intention is not to limit the invention to the particular embodiment described. On the contrary, the invention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements that transmit images. In applications requiring real-time processing of video and audio data types of input data sources for real-time viewing of multiple locations on a single display, such as multi-point videoconferencing, the present invention has been found to be particularly advantageous in that it is readily and inexpensively implemented. An appreciation of the invention may be ascertained through a discussion in the context of such real-time applications. The figures are used to present such an application.

Turning now to the drawings, FIG. 1 illustrates one of four stations in a data processing system arranged for an example four-point videoconferencing (real-time) application. The system includes data communication equipment at a first site, Site A, depicted above a communication channel 12 of FIG. 1 for this first one of four stations, and a signal coordination equipment 30 at another site, depicted below the communication channel 12. To accommodate a full-duplex arrangement, each of the sites A, B, C and D is comparably equipped with both data-sending and data-receiving equipment, similar to the equipment shown above the channel 12 in FIG. 1.

At Site A, a channel interface device 10 is used to communicate processed data over the communication channel 12. The data that is presented to the channel interface device 10 is collected from various types of data sources including, for example, a video camera 16, a microphone 18, a user control device 20, and a conventional personal computer 22. The data sources typically use buffers to store the data to be collected. The data collected from each of these data sources is received by multiplexing/demultiplexing data processing equipment (DPE) 24. The DPE 24 monitors the available channel bandwidth and, based on its capacity to transmit additional data, collects and formats the data collected from each of the input sources so as to maximize the amount of data to be transmitted over the channel 12.

In the above-referenced full-duplex arrangement, a monitor 40 is used to display video images captured locally by the video camera 16 and video images captured remotely by video cameras (not shown) at the other three sites in this example application. The DPE 24 displays the locally-captured images in a "Local site" quadrant. The images captured at the other two sites are displayed in the remaining three quadrants.

The communication channel 12 is depicted with a first segment 12a and a second segment 12b. In certain embodiments of the present invention, the communication channel 12 is integral in that the segments 12a and 12b are effectively directly-coupled. Such embodiments, for example, include one of the sites B, C and D included as part or connected with the signal coordination equipment 30. In other embodiments of the present invention, each site A, B, C and D is remote from the signal coordination equipment 30, and each site has its own channel interface device communicating with a dedicated, oppositely arranged channel interface device. In one example embodiment, the signal coordination equipment includes a DPE for each independent site.

To produce the desired multi-site display at each site, the corresponding DPE for each site overlays each set of video data received over the communication channel on top of the illustrated quadrant. The region, or in this example "quadrant," is selected by the signal coordination arrangement (FIG. 2) based on an algorithm that combines and rejects video data from various input sources depending on the placement of an associated unit in a cascaded set of co-located control units.

The monitors at each of Sites B, C and D are used in substantially the same way as the monitor 40 at Site A. Locally-captured images are displayed in a "Local Site" quadrant. The images produced from the other two sites are displayed in the remaining quadrants, for Sites B, C and D.

Referring now to FIG. 2, an example implementation of the signal coordination equipment 30 of FIG. 1 is depicted as 60. The signal coordination equipment 60 of FIG. 2 includes four similarly-constructed video communication devices 62–65. The video communication device 62 communicates with Site A using conventional video conferencing techniques.

Images captured at Site A are received over the communication link 70, separated from outgoing information and processed for decoding along path 70'. The video communication device 62 formats the Site A image for one of the four display quadrants and uses the remaining three quadrants for video received at a second input 72 of the video communication device 62. The image transmitted back to Site A over the communication link 70 is the combined video data formatted as shown, with Site A images formatted in one quadrant and images corresponding to the other sites formatted in the other quadrants.

Images captured at each of the other sites are similarly received and processed over the respective communication links 78, 79 and 80. The video communication devices 63–65 respectively format the images received over these communication links 78, 79 and 80 for their respectively assigned display quadrants, as shown in FIG. 2. As with the video communication device 62, each of the video communication devices 63–65 includes a second video input port for receiving video data in a cascaded manner. The cascaded video output from the video communication device 62 is fed to the second video input of the video communication device 63, and the cascaded video output from the video communication device 63 is fed to the second video input of the video communication device 64. The cascaded video output from the video communication device 64 is fed to the second video input of the video communication device 65, and the video output from the video communication device 65 at port 84 is fed back to the second video input 72 of the video communication device 62.

The images transmitted back to the respectively corresponding sites over the respective communication links are the combined video data formatted as shown, with the corresponding site images formatted in one quadrant and images corresponding to the other sites formatted in the other quadrants. In this manner, the formatting of incoming video images for a designated one of the quadrants uses a video combination/rejection process that can be thought of as inverse picture-in-picture (PIP) coding, using a cascade connection arrangement based on screen region. The video output of each video communication device is used as a cascaded input to the next video communication device and is retransmitted back to the respective site. The number of participating multi-conferencing users can vary. In one embodiment, the number of participating multi-conferencing users is limited only by the number of cascaded video communication devices in the signal coordination arrangement and by the size of the display screens used at each site.

According to one specific example implementation of the present invention, various commercially-available video conferencing units are used as each of the cascaded video communication devices in the signal coordination arrangement, and compatible or similarly-constructed video conferencing units are used at the remote sites. For example, as shown at the bottom of FIG. 1, each of the units in this specific example implementation can be an enclosed VC50 (or VC55) unit 30a, 30b, 30c, 30d, available from 8×8, Inc. of Santa Clara, Calif.; the units 30a, 30b, 30c, 30d shown being mounted in frame 31. In a certain embodiment thereof, the assigned location of the site to the quadrant (e.g., Site A to upper left quadrant) is implemented within each of the signal communication devices in the signal coordination arrangement through use of a programmed menu option displayed for and selected by the person controlling the signal coordination arrangement. This arrangement permits the controller person to designate a different one of the four quadrants (or sections) for each signal communication device in the signal coordination arrangement.

Alternatively, commercially-available tiler devices are used within the signal coordination arrangement between the video outputs and the video inputs of each signal communication device. Such tiler devices are available, for example, from Radio Shack stores. This approach can be used to implement the entire system using commercially-available parts; however, with the added expense of the tiler devices.

As indicated above, the cascaded arrangement 60 can be implemented at a central site remote from the user sites, Sites 1, 2, 3 and 4. Alternatively, the cascaded arrangement 60 can be co-located at one of the Sites 1, 2, 3 and 4. Using either option, a display can be co-located for the controller person's benefit in setting up and monitoring the system operation, as well as for maintaining user validation and integrity throughout the initialization and maintenance of a multi-party video conference call.

An infinite mirror video loop effect is avoided since each unit cancels the feedback by overlaying its current video over the correct region containing its previous video signal.

Audio can be combined using an audio mixing function. The cascaded arrangement of FIG. 2 can be used with audio and video being combined simultaneously, or an external low-cost N:1 audio mixer can be used. In the example case of FIGS. 1 and 2, N equals 4. In a more specific implementation, to perform the audio bridging function, the audio input sources for the ViaTV VC55's are used in a mix mode (with the Voice Level menu set to 7-all VCR, no phone). Externally, twelve RCA cables and four 1-to-3 Y-connectors are used to connect the three audio inputs of each VC55 to the audio outputs to the other three units in the system. All units transmit back to their remote user the audio of the other three units to avoid a user hearing his/her own echo.

This multi-point system can be extended to more than four users. It is also easily extended to ISDN or H.323 units to avoid the costly alternative of traditional continuous-presence boxes.

Audio mixing does not need to have N-1 inputs on every video communication device. An N-way multi-point switch can be used in the above manner described for the video and the audio. This is accomplished by routing the audio as is described for the video. The audio output of one device feeds the audio Input of the next. Mixing happens by adding your local signal to the audio input and sending the result to the output. A user avoids hearing his/herself by using conventional echo cancellation techniques that delete the audio inserted when the stream is fed back around. This way only one audio input is needed per box. There is delay added per box in the chain. In one embodiment, this issue is addressed by using a large window of saved audio samples to perform the cancellation.

According to another embodiment, a signal coordination arrangement comprises a sixteen-way switch arranged as indicated above in connection with FIG. 2. In operation, the signal coordination arrangement can process a multi-party conference for two participants by using two larger regions of the display, and when additional participants join in, the region count increases to six. This can be achieved by adding into the video out signal (along one side of the transmit image) information that allows any video communication device in the video loop to know how many video communication devices are in the loop. This is accomplished, among other ways, by assigning numbers to each box and then having the box overlay a small "presence" block on the left edge of the screen at a position determined by the boxes number. By scanning this area, every video communication device knows how many other video participants exist, and this information is used along with the video communication device's assigned number to determine dynamically whether and how to alter the view.

Using 8×8 ViaTV devices (e.g., VC150s), without multiple decoders included in such devices, an H.324 multi-way call uses at least two codec passes to convey audio/video information from one remote H.324 location to another. In connection with the present invention, it has been discovered that with excellent G.723 codec latency, there exists 300 to 500 milliseconds of round trip audio delay, and this delay is very usable in a multi-way call.

It has also been discovered herewith that since the latency of the audio and video codecs in this communication system is now effectively doubled, the delta in latency between the video and audio codecs is similarly doubled. Thus, lip synchronization in an H.324 call at bitrates less than 33.6 kilobits-per-second (even for SQCIF video) is not practicable. According to one implementation, this synchronization issue is addressed by running all of the video codecs in the multi-way call in CIF (in a ViaTV device, this translates to Quality=2 on the menu screen), since it is clear to the user that the user should not be expecting lip synchronization. This minimizes any distraction by the lack of lip synchronization in the system. The CIF setting also minimizes vertical distortion caused by two passes through the ViaTV device's QCIF-to-NTCS vertical scaling approximations. This setting can also be used with the availability of 4CIF transmission with the advantage of not losing frame buffer resolution between codec stages.

In a particular example embodiment, a four-way multi-point gateway system consists of four VC50's, one quad video multiplexer, two four-channel stereo mixers, and various power strips and patch cables, with the entire arrangement housed in a rack-mounted fan-cooled structure. The system is accessed for use by calling the controller person from any ViaTV device. The cost for the signal coordination arrangement is much less than the cost for many video conference communication devices.

For further information concerning the construction and operation of such set-top units, reference may be made to 8×8's manuals and brochures for models VC100/105, VC150, VC50 and VC55, and to U.S. patent application Ser. No. 09/005,053 filed on Jan. 9, 1998, incorporated herein by reference.

Also according to the present invention, a multi-device video arrangement provides for monitoring of multiple areas at the same time and on the same display screen. In accordance with one example embodiment, the signal coordination arrangement of FIG. 2 is configured to include a display device with one of more of the video communication devices in the signal coordination arrangement including a camera coupled thereto and directly providing images to the video communication device in place of the communication link. Further, the feedback signal for the first and last video communication devices in the signal coordination arrangement is not required when driving the display from the last video communication device in the cascaded network. In this manner, the signal coordination arrangement permits the controller person to monitor multiple areas on the same screen.

This implementation can be used with one or more of the video communication devices in the signal coordination arrangement including the illustrated communication links of FIG. 2 and one or more of the video communication devices in the signal coordination arrangement including the directly coupled camera. In any of the above embodiments, the combined (or multiple screen) regions can be recorded from any of the video communication devices in the signal coordination arrangement or from a video communication device remotely coupled via a communication link to the signal coordination arrangement. The display and/or recording devices can be located with any one or more of the video communication devices and/or with the signal coordination arrangement. Such an arrangement provides for a number of monitoring applications, including security and tracking monitoring.

The various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. A video communication system comprising:
    a plurality of stations, each station including a video camera configured and arranged to generate a video signal; and
    a central control unit including a cascaded arrangement of signal processing units, each signal processing unit constructed and arranged to receive the video signal from a corresponding one of said plurality of stations and a cascaded video signal from another signal processing unit in a cascaded manner at a designated position in the cascaded arrangement, and each signal processing unit configured and arranged to combine the video signal of the corresponding one of said plurality of stations with the cascaded video signal according to the designated position of another signal processing unit in the cascaded arrangement.

2. A videocommunication system, according to claim 1, wherein each signal processing unit is further configured and arranged to provide an output signal for displaying video signals generated by one of the stations in a first display screen region and for displaying other video signals generated by another one of the stations at a second display screen region.

3. A videocommunication system, according to claim 1, wherein each signal processing unit is further configured and arranged to receive the other video input signal from a telephone line.

4. A videocommunication system, according to claim 1, wherein each signal processing unit is further configured and arranged to receive signals, including the other video signal, from a telephone line at a first input and the cascaded video signal at a second input.

5. A videocommunication system, according to claim 4, wherein each signal processing unit is further configured and arranged to overlay the other video signal over a portion of the cascaded video signal, the portion corresponding to a region to be displayed.

6. A videocommunication system, according to claim 4, further including a switch circuit for coupling the respective video signals of the stations with the signal processing units.

7. A method of video communicating between a plurality of stations, each station arrange to generate a corresponding video signal, the method comprising:
    providing a plurality of signal processing units within a central control unit;
    receiving the corresponding video signal from a corresponding one of said plurality of stations and a cascaded video signal from another signal processing unit in a cascaded manner at each signal processing unit;
    using the central control unit to cascaded the signal processing units with each signal processing unit having a designated position in the cascaded arrangement, the position being designated by the central control unit; and
    at each signal processing unit, using the designated position of the signal processing unit in the cascaded arrangement to combine the video signal of the corresponding one of said plurality of stations with the cascaded video signal.

8. A method, according to claim 7, further including providing, at each signal processing unit, an output signal for displaying video signals generated by one of the stations in a first display screen region and for displaying other video signals generated by another one of the stations a second display screen region.

9. A method, according to claim 7, further including receiving, at each signal processing unit, the other video input signal from a telephone line.

10. A method, according to claim 7, further including receiving, at each signal processing unit, signals, including the other video signal, from a telephone line at a first input and the cascaded video signal at a second input.

11. A method, according to claim 10, further including overlaying, at each signal processing unit, the other video signal over a portion of the cascaded video signal, the portion corresponding to a region to be displayed.

12. A method, according to claim 10, wherein providing a plurality of signal processing units includes providing at least three signal processing units with each of the signal processing units being cascaded.

13. A method, according to claim 12, further including overlaying, at each signal processing unit, the other video signal over a portion of the cascaded video signal, the portion corresponding to a region to be displayed.

14. A video communication system, comprising:
    a plurality of cameras, each arranged to generate a video signal;
    a central control unit; and
    a cascaded arrangement of signal processing units within the central control unit, each signal processing unit constructed and arranged to receive the video signal from a corresponding one of said plurality of cameras and a cascaded video signal from another signal processing unit at a position in the cascaded arrangement as designated by the central control unit, and each signal processing unit configured and arranged to combine the video signal of the corresponding one of said plurality of stations with the cascaded video signal according to the designated position of the signal processing unit in the cascaded arrangement, the cascaded arrangement configured to drive a display device with regionally-assigned video images.

15. A videocommunication system, according to claim 14, wherein the cascaded arrangement is configured to drive a display device that is a video recording device.

16. A videocommunication system, according to claim 14, wherein the cascaded arrangement is configured to drive a display device that is a CRT display device.

* * * * *

UNITED STATES PATENT AND TRADEMARK OFFICE
CERTIFICATE OF CORRECTION

PATENT NO. : 6,356,294 B1  Page 1 of 1
DATED : March 12, 2002
INVENTOR(S) : Martin et al.

It is certified that error appears in the above-identified patent and that said Letters Patent is hereby corrected as shown below:

<u>Column 5,</u>
Line 53, "user" should read -- users --.

<u>Column 6,</u>
Line 66, after "1998," insert -- now U.S. Patent No. 6,124,882, issued Sept. 26, 2000, --

Signed and Sealed this

Thirtieth Day of December, 2003

JAMES E. ROGAN
*Director of the United States Patent and Trademark Office*